(12) United States Patent
Hodgkinson et al.

(10) Patent No.: US 9,994,309 B2
(45) Date of Patent: Jun. 12, 2018

(54) AIRCRAFT LANDING GEAR PITCH TRIMMER ACTUATOR WITH VARIABLE DAMPING

(71) Applicant: Safran Landing Systems UK Ltd, Gloucester (GB)

(72) Inventors: Ben Hodgkinson, Cheltenham (GB); R. Kyle Schmidt, Cheltenham (GB); David Smart, Cheltenham (GB)

(73) Assignee: Safran Landing Systems UK Ltd., Gloucestershire (GB)

( * ) Notice: Subject to any disclaimer, the term of this patent is extended or adjusted under 35 U.S.C. 154(b) by 0 days. days.

(21) Appl. No.: 14/765,448

(22) PCT Filed: Feb. 4, 2014

(86) PCT No.: PCT/GB2014/050303
§ 371 (c)(1),
(2) Date: Aug. 3, 2015

(87) PCT Pub. No.: WO2014/118576
PCT Pub. Date: Aug. 7, 2014

(65) Prior Publication Data
US 2015/0375856 A1 Dec. 31, 2015

(30) Foreign Application Priority Data
Feb. 4, 2013 (GB) .................. 1301920.3

(51) Int. Cl.
*B64C 25/60* (2006.01)
*B64C 25/34* (2006.01)
(Continued)

(52) U.S. Cl.
CPC .............. *B64C 25/60* (2013.01); *B64C 25/34* (2013.01); *F16F 9/10* (2013.01); *F16F 9/34* (2013.01)

(58) Field of Classification Search
CPC ....... B64C 25/60; B64C 25/34; B64C 25/405; B64C 25/50; B64C 25/20; B64C 25/10;
(Continued)

(56) References Cited

U.S. PATENT DOCUMENTS 2,392,892 A * 1/1946 Ward ...................... B64C 25/10
244/102 R
2,732,152 A * 1/1956 Neilson et al. ......... B64C 25/34
244/104 FP
(Continued)

FOREIGN PATENT DOCUMENTS

GB 2428650 2/2007
GB 2453554 A * 4/2009 ............. B64C 25/34
(Continued)

OTHER PUBLICATIONS

Combined Search and Examination Report dated Jun. 17, 2013 for Great Britain Application No. GB1301920.3.
(Continued)

*Primary Examiner* — Assres H Woldemaryam
(74) *Attorney, Agent, or Firm* — RatnerPrestia (57) ABSTRACT

A pitch trimmer assembly for an aircraft landing gear having a damping element arranged to be connected between a first and a second element of an aircraft landing gear and arranged to exert a first damping force when in a first state and a second damping force in a second state, the damping element being switchable between the first and second states in dependence on the relative positions of the first and second landing gear elements.

12 Claims, 4 Drawing Sheets

(51) Int. Cl.
*F16F 9/10* (2006.01)
*F16F 9/34* (2006.01)

(58) Field of Classification Search
CPC .. B64C 25/36; B64C 25/26; F16F 9/10; F16F 9/34
See application file for complete search history.

(56) References Cited

U.S. PATENT DOCUMENTS

| | | | | |
|---|---|---|---|---|
| 2,896,884 | A * | 7/1959 | Perdue | B64C 25/34 244/102 R |
| 3,845,919 | A * | 11/1974 | Jenny | B64C 25/34 188/129 |
| 5,110,068 | A * | 5/1992 | Grande | B64C 25/34 244/100 R |
| 6,308,916 | B1 * | 10/2001 | Hrusch | B64C 25/22 244/102 R |
| 2003/0033927 | A1 * | 2/2003 | Bryant | B64C 25/001 91/471 |
| 2009/0108131 | A1 * | 4/2009 | Lavigne | B64C 25/12 244/102 A |
| 2011/0180662 | A1 * | 7/2011 | Nardone | B64C 25/14 244/102 R |
| 2013/0140399 | A1 * | 6/2013 | Ducos | B64C 25/10 244/104 FP |
| 2013/0233968 | A1 * | 9/2013 | Goodburn | B64C 25/34 244/102 A |
| 2014/0374538 | A1 * | 12/2014 | Schmidt | B64C 25/34 244/103 R |
| 2015/0298798 | A1 * | 10/2015 | Holloway | B64C 25/10 244/102 R |

FOREIGN PATENT DOCUMENTS

| | | | | |
|---|---|---|---|---|
| GB | 2477758 A * | 8/2011 | | B64C 25/34 |
| GB | 2483472 | 3/2012 | | |
| WO | 9947416 | 9/1999 | | |
| WO | 2006071263 | 7/2006 | | |
| WO | WO 2006094145 A1 * | 9/2006 | | B64C 25/34 |
| WO | 2012032347 | 3/2012 | | |

OTHER PUBLICATIONS

Great Britain Search Report dated Jun. 14, 2013 for Great Britain Application No. GB1301920.3.
International Search Report for International Application No. PCT/GB2014/050303 dated May 21, 2014.
International Preliminary Report on Patentability for International Application No. PCT/GB2014/050303 dated Aug. 4, 2015.

* cited by examiner

AIRCRAFT LANDING GEAR PITCH TRIMMER ACTUATOR WITH VARIABLE DAMPING

This application is a U.S. National Phase application of PCT International Application No. PCT/GB2014/050303, filed Feb. 4, 2014, which claims the benefit of GB 1301920.3, filed Feb. 4, 2013, both of which are incorporated herein by reference.

BACKGROUND

Many larger aircraft use main landing gear that has two or more sets of wheels mounted on a bogie beam, the bogie beam in turn being pivotally mounted to the main sliding tube/leg of the landing gear. In such arrangements it is common practice to provide a mechanism for controlling the relative positions of the sliding tube and the bogie beam, either to position the landing wheels in a desired attitude prior to actual touchdown, or to position the wheels and bogie beam relative to the sliding tube in a particular manner to facilitate storage of the landing gear in the fully retracted position, or a combination of both. The positioning of the bogie beam is generally accomplished using a pitch trimmer, which is typically a hydraulically operated telescopic actuator, often in combination with one or more mechanical linkages.

The pitch trimmer has the additional function of damping the motion of the bogie beam relative to the sliding tube, both whilst the aircraft is manoeuvring on the ground and also during the retraction, and possibly also the extension, phase of the landing gear. One of the more demanding instances where the pitch trimmer provides damping of the relative motion between the bogie beam and sliding tube is the rotation of the bogie beam relative to the sliding tube that occurs as the landing gear extends during and immediately after actual take off of the aircraft. Typically, the extension of the landing gear as the weight of the aircraft is removed causes the bogie beam to rotate relative to the sliding tube towards a position in which the leading pair of wheels are raised higher than the trailing pair of wheels, this being referred to as the normal trail position of the bogie beam. During this phase, referred to as free recoil, there is a potential for the bogie beam to "over rotate" beyond the normal trail position. Depending upon the rate at which the sliding tube extends, i.e. the sliding tube extension velocity, the bogie beam will have varying rotational energies when it reaches the normal trail position. For rotational energies beyond a typical prescribed limit, over rotation of the bogie beam will occur that may be sufficient to overcome the damping provided by the pitch trimmer and result in contact between the bogie and the sliding tube. This contact is not desired as it may cause damage to the bogie beam and/or the sliding tube.

One existing solution to mitigate the effects of such undesired contact between the bogie beam and sliding tube is to fit one or more stop pads on the bogie beam that provide a degree of separation between the bogie and sliding tube should over rotation occur. However, such stop pads do not actually stop the contact between the stop pad itself and the sliding tube occurring and additionally provide little or no damping of the motion or the contact when it occurs. Consequently, damage to the sliding tube or the stop pad may still occur, whilst the addition of the stop pads introduces undesirable additional overall weight to the landing gear assembly.

Existing pitch trimmers have a degree of damping which damps low energy over rotations to position the bogie in its correct orientation, preventing contact between the sliding tube and bogie beam. This damping is however designed to damp landing loads and bogie motion during four-wheel contact ground movements and consequently the damping is insufficient to arrest the bogie rotation in the increasing trail direction during over rotation of the bogie beam during free recoil.

SUMMARY OF THE INVENTION

According to a first aspect of the present invention there is provided a pitch trimmer assembly for an aircraft landing gear, the assembly comprising a damping element arranged to be connected between a first and a second element of an aircraft landing gear and arranged to exert a first damping force when in a first state and a second damping force in a second state, the damping element being switchable between the first and second states in dependence on the relative positions of the first and second landing gear elements.

The pitch trimmer may include a valve arranged to modify the flow of a damping fluid within the damping element when the pitch trimmer assembly is in the second state, the valve being actuated when the pitch trimmer is in a retracted state.

Additionally, the valve may comprise one of a poppet and a needle valve and is arranged to mechanically engage with a portion of the damping element when the pitch trimmer is in the retracted state.

In further embodiments, the pitch trimmer assembly may include a valve arranged to modify the flow of a damping fluid within the damping element when a valve actuating element is in a compressed state and wherein the pitch trimmer assembly further comprises first and second articulation links pivotally connected to an end of the damping element, the valve actuating element being arranged to be compressed by one of the articulation links when said articulation links are within a predetermined range of relative configurations.

The predefined range of relative configurations of the articulation links may be arranged to occur when the damping element is retracted and the articulation links are at an angle to one another that is less than a predefined value.

In other embodiments of the present invention the pitch trimmer assembly may further comprise a fluid flow circuit connected to the damping element, the fluid flow circuit including a timing valve arranged to isolate the damping element from a fluid supply for a predetermined period of time after being actuated, the timing valve arranged to be actuated in response to a gross flow condition of fluid through the damping element.

The timing valve preferably includes a needle valve having a return spring and the stiffness of the return spring determines the duration of the period that the timing valve isolates the damping element from the fluid supply.

Additionally or alternatively, when the damping element is in the first state the damping rate provided by the damping element is less than when the damping element is in the second state.

According to a further aspect of the present invention there is provided an aircraft landing gear comprising a telescopic strut and a pitch trimmer according to the preceding aspect of the invention, the pitch trimmer being connected to the telescopic strut.

DESCRIPTION OF EMBODIMENTS OF THE PRESENT INVENTION

An example of a typical main landing gear arrangement is illustrated in FIGS. 1a-1d. The landing gear includes a sliding tube 2 having an upper portion 3 and a lower portion 4, the lower portion 4 of the sliding tube being pivotally connected to a bogie beam 6. A pair of articulation links 8, 10 are connected between the upper portion of the sliding tube 3 and the bogie beam 6, an upper articulation link 8 being pivotally connected to the sliding tube and in turn pivotally connected to a lower articulation link 10, the other articulation link being in turn pivotally connected to the bogie beam. A pitch trimmer 12 is pivotally connected between the upper portion 3 of the sliding tube and the articulation links, in the example shown being connected to the upper articulation link 8. By retracting or extending the pitch trimmer 12 the relative geometry of the upper and lower articulation links 8, 10 can be altered, thereby in turn altering the relative position of the bogie beam 6 with respect to the sliding tube 2.

Figure 1A:
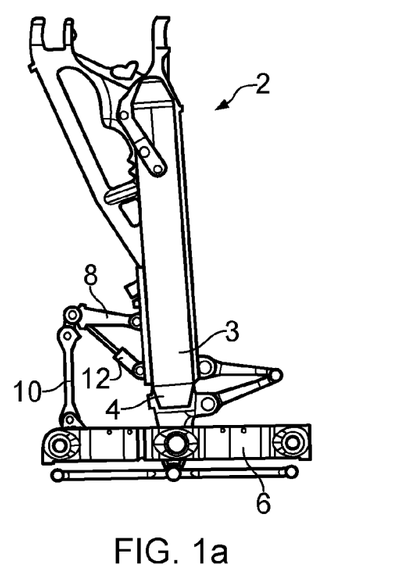
FIGS. 1a-1d schematically illustrates a main aircraft landing gear having a pitch trimmer at different times during the take off phase.
Figure 1B:
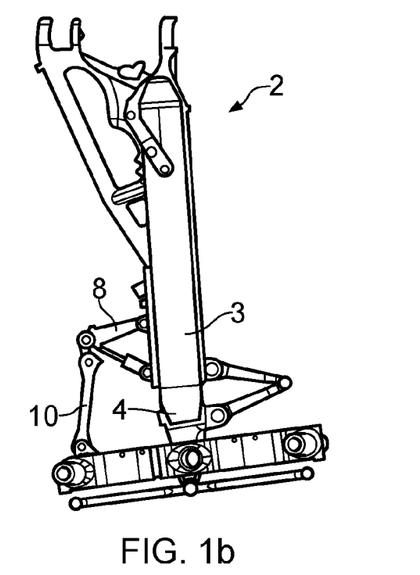
Figure 1C:
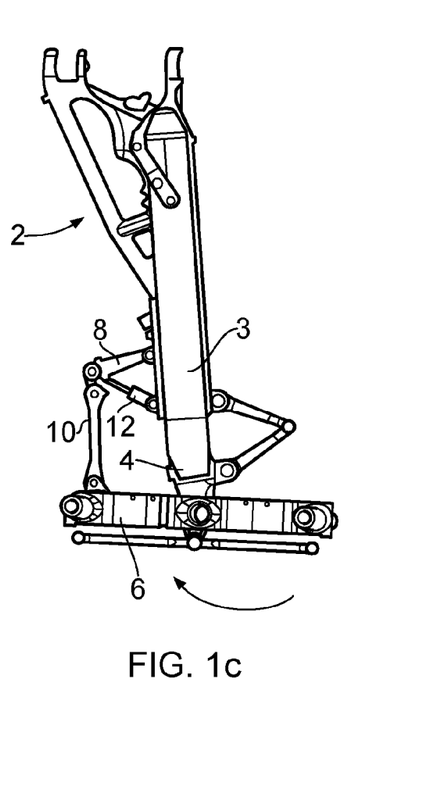
Figure 1D:
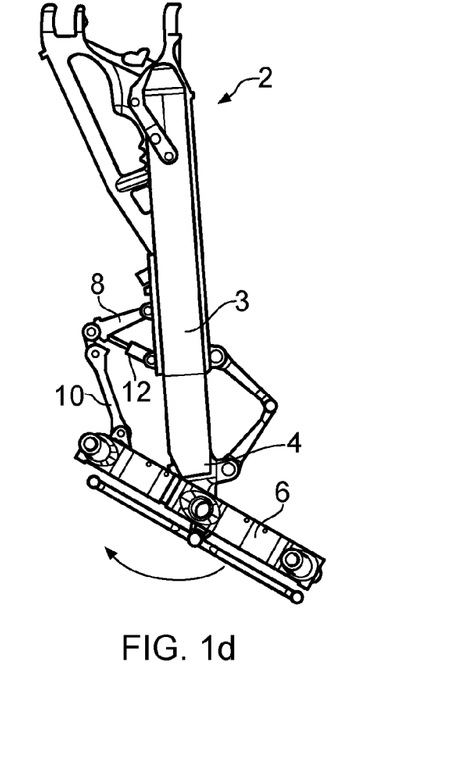

FIGS. 1a-1d illustrate the range of motions experienced by the various landing gear elements during take off of the aircraft. In FIG. 1a the landing gear is represented in the static position adopted by the landing gear when the aircraft is on the ground, the landing gear supporting the full weight of the aircraft. In this position, the sliding tube 2 is fully compressed and the bogie beam 6 is substantially horizontal, such that all four of the landing wheels are in contact with the ground. Any rotation of the bogie beam 6 about the lower portion 4 of the sliding tube, for example as may occur as the aircraft taxis over uneven portions of the runway, are translated into movement of the upper and lower articulation links 8, 10, which in turn causes either an extension or retraction of the pitch trimmer, the pitch trimmer operating in this instance to damp that motion. FIG. 1b represents the landing gear immediately after the weight of the aircraft has been removed, i.e. as the aircraft is beginning to lift off from the runway. The sliding tube 2 has begun to extend due to its internal spring pressure. At the same time the pitch trimmer is operated to begin retraction, thus causing the pivot point between the upper and lower articulation links 8 and 10 to lower with respect to the upper portion 3 of the sliding tube, thereby in turn pushing the lower articulation link 10 down, thus causing the nose of the bogie beam 6 to be pushed down. FIG. 1c shows the main landing gear with the sliding tube further extended and with the pitch trimmer fully retracted. Due to the pitch trimmer being fully retracted, the pitch trimmer, articulation link and a proportion of the sliding tube 3 are now fixed relative to one another, thus causing the pivot point between the upper and lower articulation links 8, 10 to also be fixed. Consequently, the further extension of the sliding tube, resulting in the effective downward motion of the bogie beam pivot point on the lower portion 4 of the sliding tube, causes the bogie beam to commence rotation in a clockwise manner, i.e. the nose of the bogie beam rotate upwardly. FIG. 1d illustrates the landing gear in the fully extended position, corresponding to the final position to be adopted when the aircraft is fully off the ground and prior to the landing gear being stowed in its storage bay. As the sliding tube reaches its full extension, the bogie beam is rotating at its full angular velocity into its trail position. It is at this point that over rotation may occur and the bogie beam come into contact with the bottom of the sliding tube.

In the position illustrated in FIG. 1d the only source of damping available to resist the over rotation of the bogie beam is the pitch trimmer, which in this position is generally fully retracted. As noted above, the degree of static damping provided by the pitch trimmer is primarily designed to damp the landing modes and the bogie motion during four-wheel contact ground movements. The degree of damping required for this primary purpose is generally significantly less than is desirable to prevent contact of the bogie beam with the sliding tube in the event of over rotation of the bogie beam. The problem therefore addressed by the invention is how to provide additional damping force only when the landing gear is in the position illustrated in FIG. 1d, i.e. in the position when the bogie beam may over rotate and in which position the pitch trimmer is fully retracted such that any over rotation of the bogie beam causes an unwanted extension of the pitch trimmer.

Figure 2:
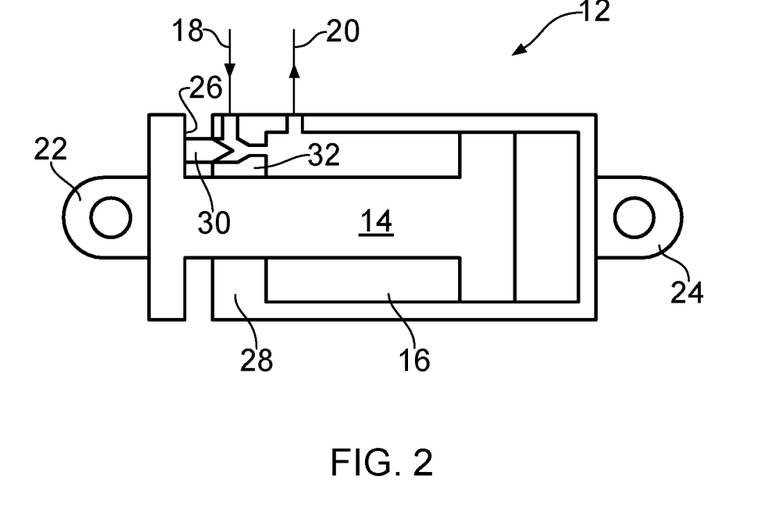
FIG. 2 schematically illustrates a pitch trimmer in accordance with an embodiment of the present invention.

FIG. 2 schematically illustrates a pitch trimmer actuator in accordance with a first embodiment of the present invention. The pitch trimmer 12 in its basic form includes a piston 14 housed within a chamber 16 which is provided with a supply of hydraulic liquid or any other suitable non-compressible or sufficiently incompressible fluid (liquid or gas or a liquid-gas combination). The hydraulic supply is provided by a pair of inlet and outlet supply pipes 18, 20 schematically illustrated as simple arrows in FIG. 2. The piston 14 passes through a closed end 28 of the pitch trimmer housing in a fluid tight manner and has a first attachment lug 22 connected to the piston. The pitch trimmer housing has a second lug 24 formed at the opposite end to the first lug. The first and second lugs 22, 24 allow the pitch trimmer to be pivotally connected between, for example using the arrangement illustrated in FIGS. 1a-1d, the sliding tube and an articulation link. By appropriately controlling the volume of hydraulic fluid within the actuator via supply lines 18, 20 the extension of the pitch trimmer can be controlled. The piston 14 has an end surface 26 that is substantially parallel to the closed end 28 of the pitch trimmer housing. A manually actuated valve 30 is formed on this surface and is arranged to engage with a valve seat 32 formed within the closed end of the pitch trimmer housing, the valve seat being in communication with the hydraulic supply line 18. The valve 30 and valve seat 32 are arranged such that when the pitch trimmer has more than a predetermined degree of extension the valve is fully withdrawn from the valve seat 32, thus allowing the flow of hydraulic fluid through the valve seat 32 in an unimpeded manner. When the valve 30 is fully withdrawn the pitch trimmer actuator is capable of exerting a first, lower, damping force. When the pitch trimmer actuator is fully retracted (corresponding to the landing gear position shown in FIG. 1d) the valve 30 fully engages with the valve seat 32 to interrupt the hydraulic fluid circuit. However, over the range of initial extension of the pitch trimmer the valve is arranged to be partially, but not fully, open. This can be accomplished by choice of the length or shape of the valve, or a combination of both. When partially open the valve allows fluid flow in the hydraulic circuit but at a restricted flow rate. This therefore imposes a second, greater, damping force on the pitch trimmer actuator over the initial extension of the pitch trimmer.

In use, the mechanical configuration of the pitch trimmer, sliding tube and articulation links is arranged such that the pitch trimmer is fully retracted when the sliding tube of the landing gear is fully extended and the bogie beam is in its full trail position. Consequently, any over rotation of the bogie beam (and resulting uncommanded extension of the pitch trimmer) would be more strongly damped by the pitch trimmer due to the pitch trimmer being in its second damping state in which the valve in the hydraulic fluid flow is restricted, thereby increasing the degree of available damping. In other configurations during ground operations, for example, the pitch trimmer would be extended beyond the predetermined degree, such that the valve is fully open and the degree of damping provided by the pitch trimmer is significantly less, i.e. more appropriate to damping ground operation movements, for example. In this arrangement the pitch trimmer is arranged to provide two separate degrees of damping force and is switchable between the two states in which the different degrees of damping are provided in accordance with the mechanical configuration of the various elements of the landing gear.

The valve and valve seat may be arranged as a simple poppet valve or alternatively a needle valve, preferably sprung loaded, may be provided to perform the same function, the advantage of the needle valve being that the transition between the first and second damping states of the pitch trimmer can be performed in a more gradual and controlled manner according to the profile of the needle valve. This is likely to be advantageous to avoid sudden step changes in the forces and pressures experienced within the damping fluid supply circuit. Additionally, a gradual change of damping characteristic in the pitch trimmer provided by a needle valve will avoid step changes in the forces being reacted through the various elements of the landing gear during an over rotation of the bogie beam. Preferably, the additional damping provided in the second damping state, i.e. with the poppet or needle valve partially closed, is sufficiently greater than the normal, first, damping state to prevent the bogie beam from striking the sliding tube even during an over rotation of the bogie beam.

In the embodiments of the present invention described above, the additional damping force is active over the initial small extension of the pitch trimmer from its nominally fully retracted position until the poppet or needle valve is fully open. In some circumstances this greater degree of damping over the initial extension of the pitch trimmer may be undesirable. For example, during landing it is possible for the bogie beam to be fully rotated into the trail position, with the pitch trimmer being fully retracted and the higher degree of damping being operational. At landing, there is a transition phase between two-wheel mode of operation and four-wheel mode of operation, as the weight of the aircraft is applied to the wheels and bogie beam. At the initial point of this transition, i.e. when the bogie beam is still in the full trail position, the higher degree of damping is operational, such that rotation of the bogie beam away from the trail position will initially be acting against the increased damping force, thereby resulting in a transient peak internal pitch trimmer pressure, which may be of such a magnitude that it is undesirable from the pitch trimmer reliability aspect.

Figure 3A:
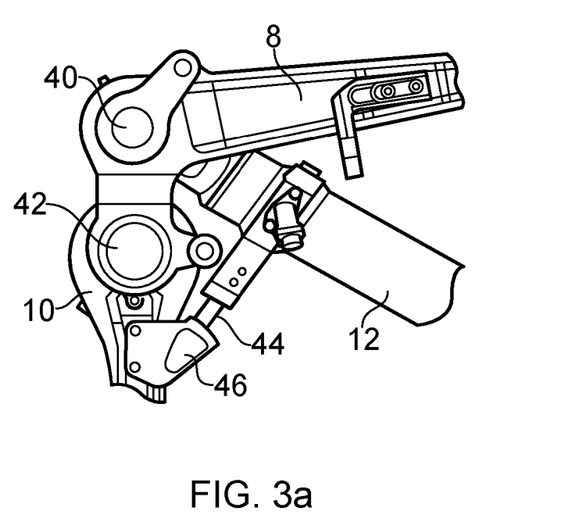
FIGS. 3a & 3b schematically illustrate in detail a portion of the articulation links and pitch trimmer in accordance with an embodiment of the present invention.
Figure 3B:
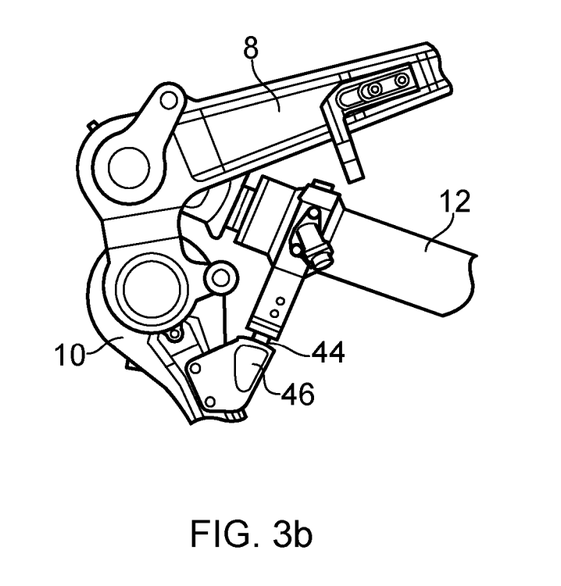

In further embodiments of the present invention the above-mentioned disadvantage is mitigated by providing a mechanism that requires the pitch trimmer actuator to be both fully retracted and one or more further elements of the landing gear to be in a physical position indicating the over rotation of the bogie beam. This ensures that the pitch trimmer actuator additional damping is active only during the free recoil phase of the landing gear and the damping is deactivated during the remainder of the landing phase. An arrangement according to one such embodiment of the present invention is schematically illustrated in FIGS. 3A-3B. FIG. 3A is an enlarged view of the connection between the upper articulation link 8, the lower articulation link 10 and the pitch trimmer actuator 12 from the landing gear arrangement illustrated in FIGS. 1A-1D. As more clearly illustrated in FIG. 3A, one end of the pitch trimmer actuator 12 is pivotally connected to the articulation link 8 by a first pivot pin 40, whilst the lower articulation link 10 is pivotally connected to the articulation link 8 by means of a separate pivot pin 42. The pitch trimmer actuator 12 is provided with a plunger 44 that has an identical function to the poppet or needle valve described in relation to FIG. 2, i.e. when the plunger 42 is fully depressed a valve within the pitch trimmer actuator 12 is at least partially closed and the pitch trimmer actuator is thus in the second, higher damping state. As can be seen in FIG. 3A, the lower articulation link 10 includes a physical extension, referred to hereinafter as the plunger anvil 46, that is arranged to come into contact with the plunger 44 when the angle between the upper and lower articulation links 8, 10 is less than a certain value. In FIG. 3A the plunger anvil 46 is shown as just being in contact with the plunger 44, the plunger being fully extended in this position, such that the pitch trimmer actuator has its normal, lower damping rate. The physical arrangement of the plunger anvil 46 and upper and lower articulation links is configured such that the physical configuration illustrated in FIG. 3A is achieved when the pitch trimmer is fully retracted and the bogie beam is in its normal trail position. In this position although the pitch trimmer is fully retracted, because the plunger is not depressed the lower rate of damping is still experienced by the pitch trimmer such that subsequent movement of the bogie beam away from the full trail position, such as during the transition phase from two- to four-wheel contact will not cause a transient peak in internal pitch trimmer pressure.

FIG. 3B illustrates the configuration of the upper and lower articulation links and pitch trimmer actuator in the event of over rotation of the bogie beam beyond its normal full trail position. In this circumstance the further rotation of the bogie beam causes the lower articulation link 10 to pivot with respect to the upper articulation link 8 and to reduce the angle between them (the upper articulation link and pitch trimmer actuator being fixed relative to the proportion of the slider tube). Consequently, the plunger anvil 46 is effectively brought closer to the upper end of the pitch trimmer actuator, thereby causing the plunger 44 to be depressed. This in turn acts on the internal valve within the pitch trimmer actuator so as to switch the pitch trimmer actuator into its second, upper, rate of damping. Consequently, the greater rate of damping provided by the pitch trimmer with the plunger depressed provides a greater damping force so as to resist the motion of the bogie beam and thereby ideally prevent any contact between the bogie beam and the lower portion of the slider.

The requirement for the pitch trimmer actuator to be fully retracted and the upper and lower articulation links to be in a particular physical configuration, i.e. with a less than particular degree of angular separation between them, results in activation of the increased damping of the pitch trimmer actuator only occurring when both conditions are satisfied. It will be appreciated by those skilled in the art that the physical activation of the increased pitch trimmer damping in accordance with the relative positions of two or more elements of the landing gear may be achieved in a manner other than that illustrated in FIGS. 3A and 3B, depending upon the exact nature and arrangement of the landing gear in use.

Figure 4:
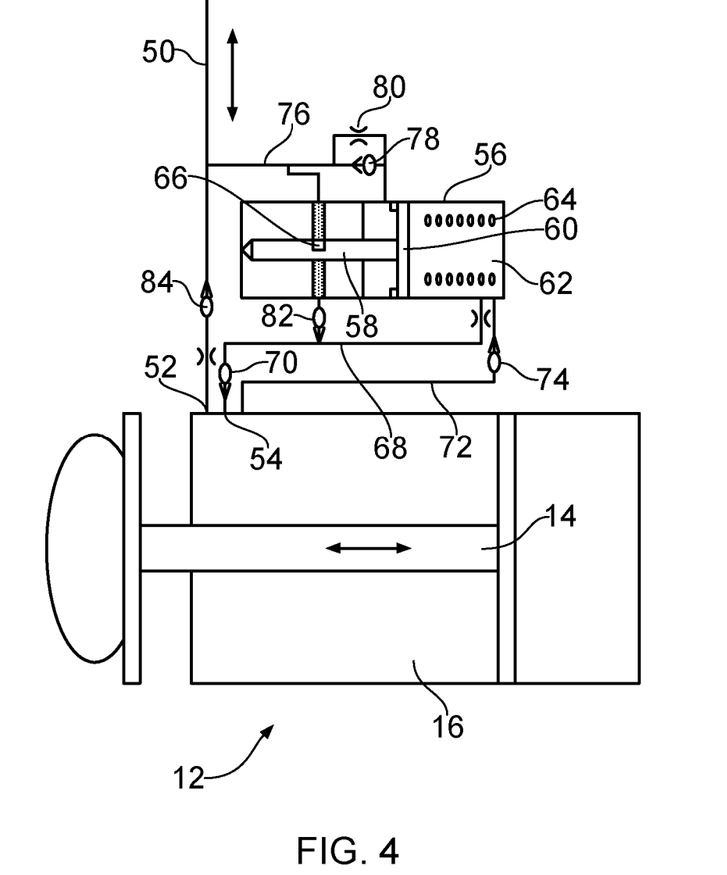
FIG. 4 schematically illustrates a pitch trimmer hydraulic circuit in accordance with an embodiment of the present invention.

FIG. 4 illustrates a further embodiment of the present invention. As previously noted with respect to FIGS. 1a-1d, the mechanical arrangement of the elements of the main landing gear, and in particular the upper and lower articulations links 8, 10 and the pitch trimmer actuator 12, is such that during take off the pitch trimmer will fully close just prior to the point in time that the bogie beam commences to rotate relative to the sliding tube. A fixed recoil event, that is an instance of over rotation of the bogie beam resulting in contact between the bogie beam and the sliding tube, can therefore only occur a short period of time afterwards. In the embodiment illustrated in FIG. 4 this knowledge of the anticipated timing of events is utilised to switch the pitch trimmer to the second, increased, damping condition for a set period after the pitch trimmer has fully closed. The pitch trimmer 12 includes a piston 14 housed within a chamber 16 that is connected to a hydraulic fluid supply line 50. A timing valve arrangement 56 is also fluidly connected to the chamber 16 of the pitch trimmer and the hydraulic supply line. The timing valve arrangement includes a needle valve 58 that includes a needle valve piston 60 housed within a needle valve chamber 62. The needle valve piston is mechanically biased by a spring 64 towards a first position in which the valve piston is fully extended (as illustrated in FIG. 4). The needle valve 58 includes a valve 66 that cooperates with the needle valve piston such that when the needle valve piston 60 is fully extended the valve 66 is fully open. A first fluid line 68 is connected between the pitch trimmer chamber 16 and the needle valve chamber 62, with a one-way valve 70 permitting fluid flow through the first fluid line 68 from the pitch trimmer chamber to the needle valve chamber only. A second fluid line 72 is also connected between the pitch trimmer chamber and the needle valve chamber with a second one-way valve 74 permitting fluid flow from the needle valve chamber 62 to the pitch trimmer chamber 16 only, i.e. the opposite sense to the first one-way valve 70. The first and second fluid lines are connected to the needle valve chamber at the same side of the needle valve piston 60 at which the biasing spring 64 is located. A third fluid line 76 is connected between the hydraulic supply line 50 and the needle valve chamber 62, the connection to the needle valve chamber being on the opposite side of the needle valve piston 60 to the biasing spring 64. A third one-way valve 78 is included within the third fluid line permitting fluid flow only in the direction from the supply line 50 to the needle valve. A fluid flow restrictor 80 is connected in parallel with the third one-way valve 78. The valve 66 within the needle valve is fluidly connected on one side to the hydraulic supply line 50 and on the other side to the first fluid line 68 via a fourth one-way valve 82 arranged to permit fluid flow only towards the supply line 50. A fifth one-way valve 84 is located in the hydraulic supply line 50.

Under normal operating conditions, such as when the landing gear is deployed and the plane is on the ground, a first, low, degree of damping of the pitch trimmer is provided by the timing valve arrangement 56 as follows. Hydraulic fluid tends to fill the pitch trimmer chamber 16, urging the pitch trimmer into its retracted state, the hydraulic fluid flowing through the fifth one-way valve 84. If force is applied to the pitch trimmer through the remaining landing gear elements causing the pitch trimmer to extend then fluid is expelled from the pitch trimmer chamber via the first one-way valve 70, fourth one-way valve 82 and needle valve 66. Under these conditions the pressure differential across the needle valve piston 60 in combination with the spring force is sufficient to ensure the needle valve piston is fully extended such that the needle valve 66 is fully open, thus providing minimum restriction of the fluid flow out of the pitch trimmer and therefore providing a low degree of damping.

However, during take-off and recoil of the landing gear the pitch trimmer retracts from an extended or semi-extended position to a closed (fully retracted) position causing a large demand of hydraulic fluid to fill the pitch trimmer chamber 16 (gross flow condition). In this condition the pressure differential across the needle valve piston 60 is such that the supply system pressure exceeds the fluid pressure in the other side of the needle valve chamber and the spring pressure, causing the needle valve piston to retract (move to the right of FIG. 4). This in turn restricts or blocks (depending on extent of movement of the needle valve piston) the needle valve 66. Consequently, the fluid flow path out of the pitch trimmer via one-way valves 70 and 82 is now restricted giving rise to a second, greater, degree of pitch trimmer damping. Once in the second damping state any force applied to the pitch trimmer causing the pitch trimmer to extend generates a relatively high fluid pressure within the pitch trimmer chamber 16 (as fluid flow through the first fluid line 68 is restricted by the partially or fully closed valve 66). This high pressure is transmitted through the fluid line 68 to the needle valve chamber 62 and, in combination with the bias force of the spring 64, is sufficient to overcome the system supply pressure acting on the other side of the needle valve piston 60 via the fluid line 76, thus pushing the needle valve piston back towards its extended position. However, the fluid flow restrictor 80 limits the rate at which the needle valve piston can be translated. By tuning combinations of the fluid flow restrictor 80, spring 64 rate and other one-way valves, the response time of the needle valve can be set to a desired level, this allowing the duration of time in which the pitch trimmer is in the state of high damping to be tuned.

The invention claimed is:

1. A pitch trimmer assembly for an aircraft landing gear, the pitch trimmer assembly including a telescopic pitch trimmer actuator arranged to be connected between a first element of the aircraft landing gear and a second element of the aircraft landing gear, the pitch trimmer actuator being arranged to exert a first damping force when in a first state in which the pitch trimmer actuator is not fully retracted and a second damping force greater than the first damping force when in a second state in which the pitch trimmer actuator is fully retracted, the pitch trimmer actuator being switchable between the first state and the second state in dependence on the relative positions of the first element of the landing gear and the second element of the landing gear; wherein the pitch trimmer assembly includes a valve arranged to modify the flow of a damping fluid within the pitch trimmer actuator to place the pitch trimmer actuator into the second state when a valve actuating element is in a compressed state, and wherein the pitch trimmer assembly further comprises a first articulation link and a second articulation link pivotally connected adjacent an end of the pitch trimmer actuator, the valve actuating element being arranged to be compressed by one of the first articulation link and the second articulation link when first articulation link and the second articulation link are within a predetermined range of relative configurations.

2. The pitch trimmer assembly according to claim 1, wherein the predetermined range of relative configurations is arranged to occur when the pitch trimmer actuator is retracted and the first articulation link and the second articulation link are at an angle to one another that is less than a predefined value.

3. An aircraft landing gear comprising a telescopic strut and the pitch trimmer assembly according to claim 1 connected to the telescopic strut.

4. The pitch trimmer assembly according to claim 1, wherein the first element comprises a sliding tube upper portion of the landing gear, and the second element comprises a first articulation link pivotally connected to the sliding tube upper portion.

5. The pitch trimmer assembly according to claim 1, wherein the first element comprises a sliding tube upper portion of the landing gear, and the second element comprises a bogie beam pivotally mounted to the end of a sliding tube lower portion that is telescopically connected to the sliding tube upper portion.

6. A landing gear comprising: a first element; a second element operatively connected to the first element; and
  a pitch trimmer assembly, the pitch trimmer assembly including a telescopic pitch trimmer actuator connected between the first element and the second element, the pitch trimmer actuator being arranged to exert a first damping force when in a first damping state in which the pitch trimmer actuator is not fully retracted and a second damping force greater than the first damping force when in a second damping state in which the pitch trimmer actuator is fully retracted, the pitch trimmer actuator being switchable between the first damping state and the second damping state in dependence on the relative positions of the first element and the second element;
  wherein the pitch trimmer assembly includes a valve arranged to modify the flow of a damping fluid within the pitch trimmer actuator to place the pitch trimmer actuator into the second damping state when a valve actuating element is in a compressed state, and wherein the pitch trimmer assembly further comprises a first articulation link and a second articulation link pivotally connected adjacent an end of the pitch trimmer actuator, the valve actuating element being arranged to be compressed by one of the first articulation link and the second articulation link when first articulation link and the second articulation link are within a predetermined range of relative configurations.

7. The landing gear of claim 6, wherein the first element comprises a sliding tube upper portion and the second element comprises a bogie beam, the bogie beam being pivotally mounted to the end of a sliding tube lower portion that is telescopically connected to the sliding tube upper portion.

8. The landing gear of claim 7, wherein the first articulation link is pivotally connected to one of the sliding tube upper portion and the bogie beam, and the second articulation link is pivotally connected to the other of the sliding tube upper portion and the bogie beam.

9. The landing gear of claim 8, wherein the pitch trimmer actuator comprises a telescoping link that is pivotally connected at a first end to the sliding tube upper portion and pivotally connected at a second end to the first articulation link.

10. The landing gear of claim 9, wherein the pitch trimmer actuator comprises a valve that is operated by contact with an anvil on the second articulation link when the bogie beam reaches a predetermined angle with respect to the sliding tube upper portion.

11. The landing gear of claim 6, wherein the first element comprises a sliding tube upper portion, and the first articulation link is pivotally connected to the sliding tube upper portion.

12. A landing gear comprising:
  a sliding tube upper portion;
  a sliding tube lower portion telescopically connected to the sliding tube upper portion;
  a bogie beam pivotally mounted to an end of the sliding tube lower portion;
  a pitch trimmer assembly comprising:
    a first articulation link pivotally connected to a second articulation link, the first articulation link further being pivotally connected to one of the sliding tube upper portion and the bogie beam, and the second articulation link further being pivotally connected to the other of the sliding tube upper portion and the bogie beam,
    a telescopic pitch trimmer actuator that is pivotally connected at a first end to the sliding tube upper portion and pivotally connected at a second end to the first articulation link, the pitch trimmer actuator being arranged to exert a first damping force when in a first damping state and a second damping force greater than the first damping force when in a second damping state, the pitch trimmer actuator being switchable between the first damping state and the second damping state in dependence on a state of retraction of the pitch trimmer actuator and the relative positions of the sliding tube upper portion and the bogie beam, and wherein the pitch trimmer actuator comprises a valve that is operated by contact with an anvil on the second articulation link when the bogie beam reaches a predetermined angle with respect to the sliding tube upper portion.

* * * * *